United States Patent Office 3,692,586
Patented Sept. 19, 1972

3,692,586
METHOD OF BATTERY PLATE MANUFACTURE UTILIZING ULTRASONIC VIBRATIONS
Roland H. Williams, Jackson, Mich., assignor to Sparton Corporation, Jackson, Mich.
No Drawing. Filed May 18, 1970, Ser. No. 38,566
Int. Cl. H01m 35/26
U.S. Cl. 136—67
1 Claim

ABSTRACT OF THE DISCLOSURE

The method of impregnating sintered battery plates or plaques with a salt bath solution which, when subjected to electrical current, forms an active metal on the battery plate utilizing ultrasonic vibrations to create a cavitation-implosion cycle within the pores of the sintered plate which augments penetration and retention of the salt bath solution within the plate.

BACKGROUND OF THE INVENTION

The invention pertains to the field of impregnating sintered metal electrodes, such as those used in batteries, wherein an active metal is formed upon the plates by electrolytic action wherein ultrasonic vibrations are employed to produce and augment penetration of the salt bath liquid in the sintered plate pores.

It is common practice to form battery plates of sintered metal, and impregnate the sintered battery plate with an active material to form a battery electrode component. For instance, nickel-cadmium batteries employ sintered battery plates, and this type of plate has received widespread acceptance in the battery manufacture art. In addition to nickel-cadmium; nickel-iron, nickel-zinc, copper-zinc and silver-cadmium are other combinations of electrodes which employ sintered battery plates.

The battery plate, or plaque, forms the basic substrate of the positive and negative battery electrodes, and by the treatment of the plate to form an active metal thereon, the plate will become a current producing electrode.

Sintered battery plates or plaques are usually manufactured by spreading or dusting powdered metal, such as nickel or copper-nickel mixtures, on a wire screen grid. The material is then heated in an endothermic, reducing atmosphere to a temperature at the melting point of the metal. For nickel, a temperature of 2000 to 2050° F. is desirable. The resultant fusion of the dust particles forms a highly porous structure, bound together by the grid into a plaque. The degree of porosity is controlled by the method of shifting and forming the metal powder. The usual plaque porosity for nickel or cadmium electrodes is 80 to 85%. The plaque thus formed serves as the carrier and current collector for the actual active material which is to be forced into the pores of the plaque.

In the formation of battery plates for use with nickel-cadmium batteries, the active material is NiO(OH), and is formed within the plaque itself. The salt bath material from which the NiO(OH) is formed is $Ni(NO_3)_2$, and it is the $Ni(NO_3)_2$ which is forced into the pores of the sintered metal plaque while in a liquid state. In order to accomplish this purpose the $Ni(NO_3)_2$ is melted to form a liquid salt bath, and such melting takes place at about 180° F. The sintered battery plaque is immersed in the hot liquid salt bath whereby the plaque may absorb the $Ni(NO_3)_2$ into its pores and voids.

Without the application of additional means, the absorption by the plaque of the liquid $Ni(NO_3)_2$ would be small, and it is common practice to create a vacuum over the molten liquid bath once the plaque is immersed therein to increase the extent of penetration and absorption. The creation of the vacuum by mechanical means causes the pressure within the voids of the plaque to expand the entrapped air, and the resultant void is displaced with the hot liquid $Ni(NO_3)_2$. In order to produce the desired impregnation the liquid bath and plaque remain under vacuum for 5–10 minutes after maximum vacuum has been achieved.

After the vacuum treatment, the plaque, which is now filled with $Ni(NO_3)_2$, is then immersed in a concentrated (30%) solution of KOH or NaOH. While immersed in this electrolyte, for instance, KOH, cathodic polarization of the plate takes place to produce the following reaction:

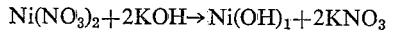

The electric current treatment to produce the active material on the battery plate or plaque requires about 30 amps per square foot of plaque for 10–20 minutes for complete conversion of the material to the active state.

During the polarization of the plate, the pores within the sintered plate or plaque are partially reopened because the volume of the active material is about one-third that of the $Ni(OH)_2$, and in order to completely fill the voids of the plaque the entire process must be repeated at least four times under most manufacturing techniques. Theoretically, a 90% impregnation can be obtained with three cycles.

The aforedescribed vacuum impregnation method of sintered battery plates has several disadvantages. An important shortcoming is the fact that the degree of vacuum that can be produced is seldom sufficient to remove all of the trapped air from the sintered plate voids in any one cycle, and thus several cycles of the process are required to fully load the plaque. Additionally, the molten $Ni(NO_3)_2$ freezes quickly on the surface of the plaque and when the polarization begins, the nickel dissolves in the electrolyte and is deposited as a poorly adherent surface sponge. This interferes with successful conversion of material deeper in the plaque's structure. The surface reaction causes a deposit of nickel metal to form from the deposition of material that inadvertently dissolves in the caustic solution. This spongy surface restricts the conversion of material in the interior pores to the NiO(OH) state. Consequently, the plaque must be brushed severely to remove this scale deposit. Even when the process is very carefully controlled and all the loose scale is removed, the surface build-up of active material can cause a noted surface effect. This is particularly seen in a low capacity plate which will take a charge only on its surface or which, after discharge, must be recharged below the normal rate in order to take a full charge. This results when the interior structure is shielded by the surface of active material.

In addition to the above shortcomings resulting from vacuum impregnation of sintered plates, heavy and expensive high capacity vacuum equipment is required, and a vacuum impregnation process is not readily adaptable to high production manufacturing techniques.

SUMMARY OF THE INVENTION

It is the object of the invention to provide an improved impregnation method for sintered battery plates or plaques wherein the time required to impregnate the plate with the salt bath material prior to electrolysis to form the active material is substantially reduced over vacuum impregnation methods, or other known impregnation methods.

Additionally, it is the purpose of the invention to provide an improved impregnation method for sintered battery plates wherein the impregnation is more complete and effective than prior known methods, and wherein the impregnation method also has the additional advantage of adding heat to the impregnation process to further accelerate the salt bath flow into the pores of the sintered plate, and wherein the impregnation method also aids in locating faulty or weakened locations in the plate.

A further object of the invention is to provide an impregnation method for battery plates wherein the deposition of the salt solution in the sintered plate pores can simultaneously occur with the polarization of the plate whereby the time required for producing an active plate is substantially reduced with respect to known techinques, and the manufacture of sintered battery plates may be readily accomplished under high production techniques.

In the practice of the invention the preparation of the sintered metal plate structure is similar to the preparation of the plate when impregnation is to be accomplished by the aforedescribed vacuum process. The unimpregnated plate is immersed in the molten $Ni(NO_3)_2$ liquid salt bath. The salt bath is located within a tank, and attached to the tank is an ultrasonic transducer or vibrator capable of producing 100 watts output per gallon of bath. In order to obtain maximum efficiency the level of the liquid in the tank is a multiple of the half wave length of the pressure wave produced by the transducer.

Upon energization of the ultrasonic transducer the resultant standing wave produces a cavitation-implosion cycle which forces the $Ni(NO_3)_2$ into the pores of the sintered plate. The cavitation produces a vacuum which displaces the air in the pores and the vacuum produced by this method is considerably stronger than the vacuum that can be produced with conventional vacuum producing apparatus.

Further, it is to be appreciated that the vacuum produced by the ultrasonic vibrations is a "local" vacuum which occurs at the location desired, i.e., within the void of the sintered metal. After the vacuum occurs due to the cavitation, the next part of the cycle is the implosion resulting from the inward burst of the gas with great pressure, and it is believed that the implosion pressures are as high as 10,000 p.s.i., which forces the salt bath solution into the sintered battery plate pores to displace the air pockets therein. The impregnation time in accord with the practice of the invention can be reduced to 30 seconds upon 20,000 c.p.s. being imposed upon the formation solution and sintered battery plate for 30 seconds. The 20,000 c.p.s. frequency is the practical lower limit for the ultrasonic vibrations due to the creation of audible sound below this frequency. After the treatment of the salt bath and sintered battery plate with the ultrasonic vibration for the desired length of time, the plaque is removed from the bath solution, allowed to drain, but not significantly cool, and is therein immersed in a polarization solution and electric current is applied thereto to polarize the plate as in the vacuum forming process. It is necessary to repeat the process and usually three cycles are required due to the partial reopening of the pores because the volume of the active material is about ⅓ that of the $Ni(OH)_2$.

The impregnation of the salt bath material into the pores of the sintered metal is augmented by the fact, that the vacuum-implosion cycles produced by the ultrasonic vibration causes an increase in temperature at the location of cavitation. The local temperatures during implosion are believed to be as high as 30,000° F., which further accelerates the material flow and displacement of the air within the voids. Thus, the use of ultrasonic vibrations also aids in the flow of the salt bath material into the voids and creates localized heat where it is of most advantage.

It is also within the scope of the invention to utilize a combination active metal salt bath and polarization solution whereby impregnation by ultrasonic vibration and polarization by electric current simultaneously occur. In the practice of this concept the ultrasonic vibration and temperature gradient keep a flow of material into the pores. The cleaning action of the cavitation breaks loose the surface scale and it drops out as a precipitate. The material which is driven into the pores reacts under the high pressure, high temperature conditions and very effectively impregnates the battery plate.

DESCRIPTION OF THE PREFERRED EMBODIMENTS

In the practice of the invention the sintered battery plates may be formed by any conventional method, such as previously described, wherein the plates are fabricated by spreading or dusting powdered metal such as a nickel or a copper-nickel mixture on a wire screen grid. The sintered metal is then heated in an endothermic, reducing atmosphere (20% CO, dew point —40° F.), to a temperature which melts the metal, for instance, 2,000° F. if nickel is being used. The fusion of the small particles forms a highly porous structure and the porosity is controlled by the method of sifting and forming the powder.

As the formation of the plate does not form a part of the inventive concept, further description thereof is not necessary, it only being understood that as the invention is directed to the method of impregnation of sintered battery plates that the battery plate be of this particular type, and capable of being subjected to ultrasonic vibration in accord with the inventive concept.

The liquid salt bath in which the sintered plate is to be immersed is contained in a tank, which is associated with, in any conventional manner, to an ultrasonic vibration generator. The ultrasonic vibrator used in the practice of the invention need not be of any particular type other than being capable of producing at least 20,000 cycles per second and having an energy output of at least 100 watts per gallon of liquid salt bath solution. It is preferred that the level of the salt bath in the tank be adjusted to constitute a multiple of the half-wave length of the pressure wave produced by the transducer. The resultant standing wave produced by the ultrasonic vibrator is therefore capable of producing maximum effect upon the salt bath wherein maximum cavitation and implosion occurs.

Due to the ultrasonic vibration treatment the small entrapped air pockets within the pores of the sintered plate will alternately expand under cavitation effects, and be contracted or implode during the retraction cycle. This inward movement of the air or gas occurs under great pressure, believed to be as high as 10,000 p.s.i., and the implosion will force the salt bath material into the sintered battery pores and displace the entrapped air pockets.

The local action vacuum created at the air pockets by the cavitation effect removes the most minute bubbles of trapped air and the ultrasonic impregnation is considered to be practically total, as compared with vacuum impregnation techniques which are not as efficient. The impact of the implosion will break down superficial structures within the plaque and fill the resultant void with liquid salt. Additionally, the occurrence of the implosion causes the creation of localized temperatures at the sintered plate voids which may be as high as 30,000° F., and the creation of this temperature further accelerates the flow of the salt bath solution into the voids to displace the air pockets.

It has been found that the time required for effective impregnation at 20,000 cycles per second is approximately 30 seconds. Under known vacuum procedures 5–10 minutes of impregnation time is required after full vacuum is attained. It is desired that the 20,000 cycle per second frequency be the lower limit at which the invention is practiced due to the creation of audible sound at lower frequencies. However, it will be appreciated that the inventive concept is not limited to this frequency, it only being necessary that the ultrasonic vibrations be of such an order as to produce the desired cavitation-implosion cycle and may range below or above 20,000 cps.

After impregnation by the ultrasonic vibration, the plaque is removed from the salt bath and allowed to drain, but is not significantly cooled. Thereupon, the drained plaque is immresed in the polarization solution and current is applied. If a nickel electrode is being used the polarization solution may consist of a concentrated (30%) solution of KOH or NaOH. A direct electrical current is thereupon imposed on the solution and plaque to produce cathodic polarization which results in the following reactions:

$$Ni(NO_3)_2 + 2KOH \rightarrow Ni(OH)_2 + 2KNO_3$$

$$Ni(OH)_2 + 2OH^- \rightarrow NiO(OH) + 2H_2O + 2e^-$$

The process of polarization requires about 30 amps per square foot of plaque for 10–20 minutes to completely convert the impregnated formation salts to an active metal state by electrolysis.

The aforedescribed process is usually repeated three times in order to assure that all of the voids of the plaque remained filled after polarization. As the pores partially reopen because the volume of the active material is only about ⅓ that of $Ni(OH)_2$, the recycling is desirable. It has been found that for a nickel electrode the cycle time in accord with the invention can be from 10 minutes to 30 minutes less than vacuum impregnation method cycles, and the number of cycles can be reduced from 6 or 10 cycles to 3 cycles.

Secondary advantages also are derived from the use of ultrasonic vibrations to impregnate the sintered metal plates as the mechanical forces imposed on the plaque while subjected to ultrasonic vibrations will expose faulty or weak spots due to improper fusion or spreading during the sintering process as this flaw will be quickly exposed by the scrubbing action produced by the ultrasonic vibrations. Thus, an inspection step may be considered to be included during the impregnating of the plaque. In this respect, the power level of the ultrasonic vibration generator, and the time cycle, must be adjusted such that excessive vibrations are not imposed upon the plaque which would cause damage or the breaking down thereof.

In the practice of the invention it is also contemplated to employ a combination liquid salt bath and polarization electrolyte wherein a simultaneous impregnation and polarization occurs.

In such a combined treatment of the sintered metal plates the plates would be immersed in a solution of, for instance, 80% $Ni(NO_3)_2$, 15% KOH and 5% water which is heated to approximately 200° F. Upon immersing the sintered battery plaque in this liquid the liquid is subjected to ultrasonic vibrations, and simultaneously, a polarization current is applied to the plaque.

This process would simultaneously force the $Ni(NO_3)_2$ into the sintered pores as it reacts under the high pressure, and high temperature conditions of the cavitation-implosion cycles, and as the electrolysis takes place the $NiO(OH)$ will be held in place by a nickel-nickel bond. The ultrasonic vibration and temperature gradient will keep a flow of material occurring into the pores, and the cleaning action of the cavitation will break loose surface scale which will drop as a precipitate.

After impregnation has been completed, at which time the electrolysis to form the active metal will also have been completed, the plaque is removed from the solution and brushed if necessary. In the practice of this concept of the invention only one cycle is required for complete formation and polarization of a sintered battery plate.

Battery plates constructed in accord with the invention utilizing ultrasonic vibration to impregnate the sintered metal are equal in every way, physically and electrically, to vacuum process formed electrodes. Reliability is considered to be increased in the practice of the method of the invention as there is less loss in capacity of the battery over a period of charge-discharge cycles, and ultrasonic impregnation impregnates the porous plates to a deeper extent than a vacuum process, making them less susceptible to surface conditions.

While the basic concept of the invention has been described with respect to the impregnation of battery plates with a liquid salt bath capable of forming an active metal, ultrasonic vibrations may be employed to improve the impregnation of other types of liquids into porous members. For instance, oil or other lubrication fluids could be impregnated into bearings, gears, and the like formed of sintered metal, by the practice of the invention.

It is appreciated that various modifications to the inventive concept may be apparent to those skilled in the art without departing from the spirit and scope of the invention.

I claim:

1. The method of impregnating sintered metal battery plates with an active material comprising immersing the sintered metal battery plate into a combination salt bath solution of active material and a polarization solution for polarizing the plate by an electric current, imposing ultrasonic vibrations upon said solution and plate to produce cavitation-implosion cycles within said solution causing said solution to be forced into the voids within said battery plate to impregnate said plate with said solution, and simultaneously imposing an electric current on the plate to polarize the plate during impregnation thereof.

References Cited

UNITED STATES PATENTS

| 3,041,388 | 6/1962 | Fukuda et al. | 136—24 |
|---|---|---|---|
| 3,335,033 | 8/1967 | Kober | 136—29 |
| 3,507,699 | 4/1970 | Pell | 136—76 |
| 3,194,681 | 7/1965 | Nicholson et al. | 117—DIG. 008 |
| 2,996,038 | 8/1961 | Hunicke | 117—DIG. 008 |
| 2,831,044 | 4/1958 | Bourgault et al. | 136—29 |
| 3,242,010 | 3/1966 | Bodine | 136—86 |
| 3,579,385 | 5/1971 | Feduska et al. | 136—67 |
| 3,542,600 | 11/1970 | Pohlmann | 136—120 |

ANTHONY SKAPARS, Primary Examiner

U.S. Cl. X.R.

136—76